Patented Apr. 16, 1940

2,197,442

UNITED STATES PATENT OFFICE 2,197,442

PIGMENT CONTAINING AMINOTRIAZINE-ALDEHYDE CONDENSATION PRODUCTS

Gustav Widmer, Basel, Switzerland, assignor, by mesne assignments, to Ciba Products Corporation, Dover, Del., a corporation of Delaware No Drawing. Application December 13, 1937, Serial No. 179,612. In Switzerland December 16, 1936

8 Claims. (Cl. 260—39)

The invention relates to improvements in pigments consisting in combining a coloring matter and a condensation product from an aminotriazine with an aldehyde.

I have found that the products obtained by causing aminotriazines to react with aldehydes are particularly useful agents for the manufacture of pigments.

Such condensation products are for instance described in the copending applications Ser. Nos. 68,355 and 169,068.

The condensation products from formaldehyde and 2.4.6-triamino-1.3.5-triazine are particularly suited for the purpose of the present invention; however, also other aminotriazine-aldehyde condensation products are useful, for instance the formaldehyde condensation products from 2-chloro-4.6-diamino-1.3.5-triazine, 2-hydroxy-4.6-diamino-1.3.5-triazine (ammeline), 2.4-dihydroxy-6-amino-1.3.5-triazine (ammelide), melam or melon, 2.4.6-triphenyltriamino-1.3.5-triazine and so on.

Also condensation products from aminotriazines with other aldehydes than formaldehyde, for instance with acetaldehyde, crotonic aldehyde, acrolein, benzaldehyde and so on may be used.

Further there are applicable also condensation products from aminotriazines and aldehydes with compounds containing alcoholic hydroxy groups, such as mono- or polyhydric alcohols having aliphatic aromatic hydroaromatic or heterocyclic radicals, viz. the condensation products described in the copending application Ser. No. 169,068. As examples of such compounds there may be mentioned those made from aminotriazines and aldehydes in the presence of methylalcohol, ethylalcohol, butylalcohol, ethylhexanol, cetylalcohol, allylalcohol, glycerol, benzylalcohol, furfurylalcohol, glucose, saccharose.

Also condensation products from aminotriazines and aldehydes with other substances capable of condensation, for instance phenol, urea, aniline or the like or mixtures of aminotriazine aldehyde condensation products with condensation products from phenol, urea or amine resins, artificial and natural resins of various kinds may be used.

The aminotriazine condensation products may be used in various stages of condensation, whether in a soluble form or an insoluble form, the state of aggregation varying from a little viscous to a highly viscous fluid or from a gelatinous or gummy mass to a solid. Both true solutions and colloidal solutions in water or organic solvents, for instance alcohol, may be used. Moreover, condensation products which are insoluble in water or owing to their basic nature are soluble in concentrated or aqueous acids with formation of salts may be used. Particularly suitable are the condensation products capable of being hardened, since these allow the attainment of completely insoluble, particularly water-insoluble pigments which do not part with the dyestuff even in boiling soap solution.

The invention consists in combining soluble or insoluble dyestuffs of various kinds with aminotriazine condensation products to produce insoluble pigments. This union may obviously be of physical or chemical nature. Very many soluble dyestuffs combine directly with an aminotriazine condensation product when the two are brought together under suitable conditions, an insoluble pigment or color lake being formed. This combination may either be merely an adsorption or the result of a chemical reaction. Insoluble coloring substances are generally fixed by the envelopment thereof with the aminotriazine condensation product. In this case the known pigment colors, for instance lamp black, Prussian blue or the like, are useful for producing the pigments which, for example, are characterized by a transparency when ground with oil. Of the soluble dyestuffs various groups of artifical and natural coloring matters come into question, for instance acid dyestuffs, basic dyestuffs, sulfur dyestuffs or vat dyestuffs. They may belong, for example, to the azo, indigo, thioindigo, anthraquinone, triphenylmethane, azine or oxazine, azomethine, nitro, stilbene or the like series.

Also dyestuff intermediates may be used in a naturally soluble form or in a form made soluble.

At any stage of the process of manufacture the condensation product may be hardened or made insoluble. The hardening may occur in neutral, acid or basic medium and in the presence or absence of a solvent, or may be hastened by the application of heat. In practice there is generally used a combination of these factors.

The modes of operation are very numerous. The coloring matter to be converted into a lake or enveloped may be mixed in the form of a colloidal solution or suspension with the aminotriazine condensation product, the latter being in the form of a solution, liquid or paste. After the homogeneous mixture has been prepared the latter may be rendered insoluble by a final hardening treatment, generally at a raised temperature. The operation produces a combination or union which in the case of soluble dyestuffs may be considered as involving adsorption, reaction and envelopment and in the case of insoluble dyestuffs more generally only envelopment. The product of the reaction or union when very finely ground and therefore converted into a color pigment is characterized by insolubility in cold and hot water and generally even in boiling soap solution; also in oils, benzine, solution of size and other known solvents and binding agents. If the operation is conducted in aqueous solution the aminotriazine condensation product may be precipitated during its progressive hardening and thus unite with the dyestuff or pigment by adsorption as well as by chemical reaction or by envelopment. In this case it is advantageous to finish with a hardening after the separation of the water. In this manner pigments are obtained which are especially easily pulverisable.

Alternatively the aminotriazine condensation product may first be hardened gradually in presence or absence of water or a solvent. The affinity for the soluble dyestuff may in this manner be increased to a maximum and may then diminish. If such product has a high affinity for the dyestuff being treated this product is suspended in a solution of the dyestuff and it adsorbs the latter smoothly from the solution and exhausts the bath, just as wool withdraws an acid dyestuff from a bath. This method is suitable therefore only for soluble dyestuffs.

As the degree of affinity of various dyestuffs for any given aminotriazine condensation product differs correspondingly with the chemical nature thereof it is possible to influence the affinity of the condensation product by a simple addition. It has been found that by using in the condensation an addition of a basic substance which can react with the aminotriazine product, for instance triethanolamine, ethylenediamine, the affinity for dyestuffs containing acid groups is very strongly increased. On the contrary the addition of an acid substance which can react with the aminotriazine condensation product, for instance tartaric acid, citric acid, improves very much the affinity for basic dyestuffs. This method of enhancing the affinity may obviously be applied to the method already explained of simultaneously hardening the dyestuff and condensation product. Pigments of a very high content of coloring matter may be obtained in this way.

A pigment may also be prepared by this invention in the presence of an added substance usually employed in making pigments or color lakes; for instance aluminium hydroxide, green earth, tannic acid, colophony, tartar emetic, barium sulfate, calcium sulfate, zinc oxide, zinc sulfide, titanium oxide, which in part affect the opacity of the product and in part the selling price thereof.

Pigments obtained by the invention are characterized in general by a high degree of brilliance and stability to boiling water and indeed to hot soap solution. In many cases indeed these agents enhance the fastness to light of the pigment. The pigments may be produced with a high content of color and are consequently of high coloring power. The color content may run for instance from 5 to 60 per cent. and even higher. Their specific gravity amounts according to the color used in most cases to about 1.4–1.6 as compared with 2.8 for green earth pigments, 2.4 for alumina pigments and 4.4 for barium sulfate pigments. These low specific gravities have the effect that when the pigments are ground in oil or other binding medium there is much less deposition than in the case of pigments produced on an inorganic basis. They serve as coloring matters for oil and size paints, for producing printing colors in the graphic arts; book printing, wallpaper printing or the like, coloring artificial masses of all kinds, for instance linoleum, or plastic masses.

The following examples illustrate the invention, the parts being by weight; the ratio of parts by weight to parts by volume is that which exists between the kilogram and the litre:

Example 1

(a) 12.6 parts of 2.4.6-triamino-1.3.5-triazine are dissolved while stirring in 40 parts by volume of neutral aqueous formaldehyde solution of 32 per cent. strength by volume on the boiling water bath. Into the colorless solution there are added 500 parts by volume of an aqueous solution of a dyestuff, for instance 6 parts of Cloth Fast Brilliant Red 2B (Schultz, Farbstofftabellen, VII edition, vol. II, page 221) at about 80° C. 10 parts by volume of sulfuric acid of 10 per cent. strength are then added, whereupon there separates rapidly a strongly colored hydrophobic resin which is at first soft but soon becomes granular and sandy. When a drop of the solution on filter paper no longer spreads with color, thus showing that the dyestuff is exhausted, the whole is allowed to cool overnight, and the resin is ground wet. The insoluble colored body thus formed is filtered, washed well and dried and hardened for 4 hours at 140° C. The finished product is easily ground and the yield amounts to about 80–95 per cent. of the parent materials.

(b) Instead of using the aminotriazine formaldehyde condensation product of unlimited solubility in water which is used above there may be substituted with like result a product of limited solubility in water which is produced from the first without further operation by heating for about ½ hour on the water bath until a sample when diluted with 4 times its volume of cold water yields a white precipitate. 40 parts of this are used corresponding with about 20 parts of dry substance.

The following table indicates a number of pigments obtainable by this invention from dyestuffs of various classes when following the prescription of the foregoing example. The letters a and b in the table indicate respectively the condensation product described in the first paragraph of the example and that described in the second paragraph.

| Experiment No. | Condensation product | Parts by weight | Dyestuff | Colour index or Schultz, Farbstofftabellen, VII Edition | Appearance of pigment | Bleeding during 5 minutes' boiling | |
|---|---|---|---|---|---|---|---|
| | | | | | | Water | Soap solution of 3 parts per mille strength |
| 1 | a | 4 | Kiton Red G | C. I. No. 31 | Bright cherry red | I | II |
| 2 | a | 5 | Orange II | C. I. No. 151 | Brilliant red orange | I | II |
| 3 | a | 2 | Solid Green JJO | C. I. No. 662 | Dull green | II | I |
| 4 | b | 5 | Cloth Fast Brilliant Red 2B | Schultz, vol. 2, page 221 | Deep blue red | I | II |
| 5 | b | 5 | Kiton Blue A | C. I. Supplement, page 44. | Brilliant pure blue | I | II |
| 6 | b | 5 | Alizarine Sapphire Blue B | C. I. No. 1054 | Deep dark blue | II | II |
| 7 | b | 5 | Cotton Yellow CH | C. I. No. 365 | Deep orange yellow | III | I |
| 8 | b | 5 | Cotton Blue N | C. I. No. 502 | Deep violet blue | I | I |
| 9 | b | 5 | Cotton Red 10B | C. I. No. 495 | Bright red brown | I | II |
| 10 | b | 2.5 | Auramine G | C. I. No. 656 | Brilliant green yellow | I | I |
| 11 | b | 5 | Alizarine Fast Violet R | C. I. Supplement, page 26. | Deep violet blue | I | III |
| 12 | b | 5 | Benzyl Green B | C. I. No. 667 | Brilliant dark green | I | II |
| 13 | b | 5 | Direct Sky Blue, green shade. | C. I. No. 518 | Deep dark blue | I | I |
| 14 | b | 5 | Acid Pure Blue R supra | Schultz, vol. 2, page 189 | Pure blue | I | II |

The fastness to water or to soap solution is tested as follows:

0.5 gram of the pigment is boiled with 10 cc. of water or soap solution for 5 minutes; then the behavior of a drop of the suspension on filter paper is observed and the result noted.

The numbers given in the table have the following significance:

I: Spreading no color.
II: Spreading a trace of color.
III: Spreading decided color.
IV: Spreading strong color.

It will be seen from this table that highly concentrated color pigments can be obtained which practically show no bleeding in boiling water or indeed in boiling soap solution.

The pigments generally are of about the same fastness to light as the soluble dyestuffs used. In a number of cases, however, the fastness to light, in comparison with that of the soluble dyestuff used, is enhanced.

*Example 2*

5 parts of Alizarine Sapphire Blue B (Color Index No. 1054), or
1 part of Eosine J (Color Index No. 768), or
1 part of Solid Green JJO (Color Index No. 662)

are respectively dissolved in a little hot water and the solutions are mixed each with 20 parts of a dry aminotriazine formaldehyde condensation product which is obtained by evaporating in a vacuum the solution described in Example 1b (powder I). The solutions are kept in the form of thin layers in a drying chest for 5 hours at 140° C., whereby the products become insoluble and bind the dyestuff. The foamy, glassy hard products are comminuted and ground in the ball mill with several times their weight of water for 4–5 days, then filter-pressed and finally dried for 4 hours at 80° C. The testing of the pigments obtained gives the same results as those recorded in Example 1, namely they do not bleed in boiling water or in boiling soap solution of 3 per mille strength and are of about the same fastness to light as the soluble dyestuffs used.

*Example 3*

100 parts of the dry formaldehyde condensation product used in Example 2 from 2.4.6-triamino-1.3.5-triazine (powder I) are hardened for 2 hours at 120° C. and ground to dust in the ball mill (powder II). 2 parts of each of the following dyestuffs are dissolved in 400–500 parts by volume of water heated to 70° C. and 8 parts of the above powder II added thereto by stirring. After standing for ½ hour a spread on filter paper is observed and in case this is not already colorless there are added 10 parts by volume of sulfuric acid of 10 per cent. strength. If there is still a colored spread more of powder II is added, and finally the whole is allowed to cool overnight; the pigment is then filtered, dried and hardened by a further heating for 2 hours at 120° C. The following results are obtained:

| Dyestuff | Color index or Schultz, Farbstofftabellen, VII Edition No. | Total Powder II, parts by weight | Appearance of the pigment | Bleeding during 5 minutes' boiling | |
|---|---|---|---|---|---|
| | | | | Water | Soap solution of 3 parts per mille strength |
| Alizarine Green G | C. I. No. 917 | 8 | Deep dark green | II | II |
| Chromium compound of the azo-dyestuff from diazotized 1-amino-2 oxynaphthalene-4-sulfonic acid and 1-oxynaphthalene-8-sulfamide. | | 8 | Deep dark blue | II | II |
| Kiton Fast Yellow 3G | C. I. No. 645 | 8 | Bright matt yellow | II | II |
| Sapphranine G 000 | C. I. No. 841 | 12 | Bright matt red | II | II |
| Chromium compound of the azo-dyestuff from diazotized 4-chloro-2-amino-1-phenol-6-sulfonic acid and 2.4-dioxyquinoline.* | | 8 | Dark Bordeaux | IV | IV |
| Violet B* | Schultz No. 783 | 12 | Dark blue violet | IV | IV |

* If these color pigments are hardened by a further heating at 140° C. for 5 hours they bleed only little (II) when boiled in water and soap solution.

*Example 4*

(a) 20 parts of the dry formaldehyde condensation product from 2.4.6-triamino-1.3.5-triazine used in Example 2 (powder I) are dissolved in 60 parts of hot water and the solution is added to one of 2 parts Rhodamine B (Color Index, No. 749) in 1000 parts by volume of water. There are further added 4 parts of tartaric acid dissolved in a little water and the mixture is heated on the boiling water bath. After a few minutes the color is exhausted from the solution and the dyestuff has formed an insoluble combination with the precipitating condensation product. The precipitate is filtered, washed and dried in the air and then hardened for 5 hours at 140° C.

(b) In the same manner as is described under (a) there is produced a pigment from 20 parts of powder I to which have been added 2 parts of Orange II (Color Index, No. 151), 2 parts of triethanolamine and 1 part of formic acid.

(c) In a manner similar to that described under (a) a pigment is produced from 20 parts of powder I with addition of 5 parts of Acid Violet 6 BN (Color Index, No. 717) and 2 parts of ethylene diamine hydrate.

The pigments boiled for 5 minutes in water or in soap solution of 3 per mille strength do not bleed and when they are exposed to light in a distemper they have a better fastness than that exhibited by the soluble parent dyestuffs.

Example 5

(a) 2.35 parts of melam are heated for 15 minutes at 110° C. in the oil bath with 4.4 parts by volume of alcoholic formaldehyde solution of 40.8 per cent. strength by volume with addition of 10 parts by volume of formic acid and 0.5 part by volume of sulfuric acid of 50 per cent. strength; the alcohol is thereby evaporated in greater part. There is produced a soft gelatinous mass which is ground in a solution of 1 part of Kiton Red G (Color Index, No. 31) in 50 parts by volume of water. The adsorption of the dyestuff is completed by warming the mixture for a few minutes. The pigment is filtered and dried overnight in the air. There are obtained after pulverization 3.8 parts of a deep pure red pigment which in boiling water does not bleed and in boiling soap solution of 3 per mille strength shows only a trace of bleeding.

(b) 7.3 parts of chloromelamine are condensed with 22 parts by volume of formaldehyde solution of 40.8 per cent. strength by volume, 12 parts by volume of alcohol of 95 per cent. strength by volume and 1 part by volume of sulfuric acid of 50 per cent. strength by volume by heating on the boiling water bath and then for ¼ hour in a reflux apparatus over an open flame; a clear solution is produced. 4 parts of Cloth Fast Orange G (Color Index Supplement, page 35) are dissolved in 20 parts by volume of water and added to the resin solution obtained as described above, whereupon a precipitate is produced. This mixture is digested on the water bath for another hour and then stirred with 50 parts by volume of water; the filtered insoluble product is washed, dried in the air and ground. There are obtained 10.3 parts of a bright orange pigment which bleeds neither in boiling water nor in soap solution of 3 per mille strength.

(c) 2.04 parts of 2-phenylamino-4.6-diamino-1.3.5-triazine (monophenylmelamine) are dissolved with aid of heat in 2.95 parts by volume of alcoholic formaldehyde of 40.8 per cent. strength by volume. To this resin solution there is added 0.75 part of Direct Sky Blue, green shade (Color Index, No. 518) dissolved in 15 parts by volume of alcohol of 65 per cent. strength. 2 parts by volume of formic acid are now added, whereupon a colored resin is precipitated. The whole is dried for 2 hours in a drying chest at 105° C. and then ground. There are obtained 3.05 parts of a deep dark blue pigment which does not bleed either in boiling water or in boiling soap solution of 3 per mille strength.

Example 6

12.6 parts of 2.4.6-triamino-1.3.5-triazine are mixed with 40 parts by volume of formaldehyde solution of 32 per cent strength by volume which has been made neutral to litmus and are dissolved therein by stirring on the boiling water bath. There is then added a finely rubbed paste of 5 parts of Indanthrene Blue R (Color Index, No. 1106) in 15 parts by volume of water and the reaction is allowed to proceed on the water bath until a sample diluted with 1 part by volume of water yields a precipitate, which happens after about 1 hour. The whole is now dried in a drying chest for 3 hours at 95° C and then hardened for 5 hours at 140° C.; it is finally ground to a dust. 22.4 parts of a deep blue pigment stable to light and water are obtained.

Example 7

20 parts of the water-soluble triamino-triazine condensation product (powder I) described in Example 2 are dissolved in 60 parts by volume of hot water and the solution is poured into a fine suspension of 10 parts of titanium dioxide in 1000 parts by volume of water. There are then added 30 parts by volume of hydrochloric acid of 10 per cent. strength and the mixture is condensed on the boiling water bath for 1 hour. It is then neutralized, whereupon a thick precipitation is produced. After cooling the mixture is ground wet, filtered and the solid matter dried in the air. There are thus obtained 27.2 parts of a pure white pigment.

By treating in a similar manner 10 parts of highly dispersed lamp black there are obtained 28.6 parts of a deep black pigment.

Example 8

126 parts of melamine (=1 mol) and 120 parts of urea (=2 mol) are dissolved with the aid of heat in 1000 parts of a solution of formaldehyde (=10 mol) and the whole is maintained boiling for ½ hour.

100 parts of Direct Sky Blue green shade (Colour Index No. 518) are dissolved in 2000 parts of water, the solution is mixed with the above condensation solution and the whole is brought to about 85° C. and 250 parts by volume of 2-N-sulfuric acid are added. There is quickly formed a cheese-like precipitate. After ¼ hour the spread of a sample on a filter paper is completely colorless. The whole is cooled and filtered on the following day, a completely colorless filtrate being obtained. The solid matter is thoroughly washed and hardened for 5 hours at 110° C.

There is obtained a deep blue pigment which does not bleed.

Example 9

A mixture of 126 parts of melamine (=1 mol), 18 parts of guanidine carbonate (=0.2 mol guanidine) and 600 parts of a neutral formaldehyde solution of 30 per cent. strength (=6 mol) is heated to boiling for 2 hours. The solution thus obtained is then mixed with an aqueous solution of 135 parts of Orange II (Colour Index No. 151) and the whole is heated in a boiling water bath. There are then added first 130 parts by volume 2-N-sulfuric acid and after ¼ hour further 70 parts by volume of 2-N-sulfuric acid, whereby a deeply colored resin precipitates. After ½ hour the whole is cooled and on the following day the reaction mixture is ground, filtered with suction and the powder thus obtained is washed and hardened for 3 hours at 110° C.

There is obtained a red-orange pigment which does not bleed.

Example 10

126 parts of melamine (= 1 mol), 600 parts of a formaldehyde solution of 30 per cent. strength and 126 parts of triethanolamine are heated together to boiling for 2 hours. The solution so obtained is then mixed first with 870 parts of 2-N-sulfuric acid and then with an aqueous solution of 220 parts of Orange II (Colour Index No. 151). There is at once produced a resinous precipitate. The reaction mixture is further treated on the water bath for ½ hour longer during which the quantity of precipitate continues to increase. On the following day the mixture is ground and filtered with suction and the red-orange pigment so obtained is hardened for 4 hours at 110° C.

Example 11

216 parts of trimethylol-melamine (= 1 mol) are introduced into a hot solution of 22.5 parts of tartaric acid (= 0.15 mol) and 25 parts of the basic dyestuff Violet B (Colour Index No. 680) in 300 parts of methyl alcohol and the whole is treated in a water bath until all has dissolved. The solution is then evaporated to dryness and the residue is hardened for 1 hour at 140° C. There is obtained a brilliant violet pigment which does not bleed.

Example 12

200 parts of alcohol and 7.5 parts of normal alcoholic hydrochloric acid are heated to boiling in a reflux apparatus, 125 parts of hexamethylol-melamine, which must be finely powdered, are added and the whole is kept boiling for 2 hours. To the condensation solution thus obtained is then added an alcoholic solution of 20 parts of Solid Green JJO (Colour Index No. 662), the alcohol is removed by distillation and the residue is hardened for 20 hours at 110° C. and then ground.

There are obtained about 150 parts of a green pigment in which a part of the alcohol has become combined by condensation.

Example 13

126 parts of finely powdered melamine (= 1 mol) are introduced into a solution of 176 parts of commercial acetaldehyde (= 4 mol) and 500 parts of alcohol and the whole is maintained boiling in a reflux apparatus for 8 hours. The condensation solution thus obtained is filtered and the filtrate is mixed with an equal quantity of water, whereby a resin precipitates. The suspension thus produced is mixed with 160 parts by volume of 2-N-sulfuric acid and a solution of 80 parts of Cotton Yellow CH (Colour Index No. 365) in 3000 parts of water and the whole is treated in a water bath for about ¼ hour. After this time the spread of a sample on a filter paper is colorless. The supernatant solution is decanted and the remaining brownish-yellow pigment is filtered with suction and hardened for 4 hours at 110° C.

Example 14

126 parts of melamine (= 1 mol) are introduced into a mixture of 316 parts of benzaldehyde (= 3 mol) and 200 parts of benzyl alcohol and the whole is maintained boiling for 1½ hours, whereby a clear solution is produced. The product is after-treated for 16 hours longer at 150° C. After this treatment it is still soft when hot but hard when cold.

1 part of the powdered resin thus obtained is suspended in 4 parts of water and the suspension is heated in a water bath and mixed with 1 part by volume of 2-N-sulfuric acid. There is then added an aqueous solution of 0.25 part of Direct Sky Blue green shade (Colour Index No. 518). After about 10 minutes the spread of a sample on a filter paper is colorless. After 20 minutes the whole is filtered with suction and the deep blue solid residue is after-treated for 16 hours at 110° C.

What I claim is:

1. A pigment powder comprising a substantially inseparable combination of a coloring matter and an insolubilized binding agent consisting substantially of a condensation product of an aminotriazine and an aldehyde, the coloring matter constituting at least 5% by weight of the pigment powder.

2. A pigment powder comprising a soluble coloring matter substantially inseparably affixed to an insolubilized binding agent consisting substantially of a condensation product of an aminotriazine and an aldehyde, the coloring matter constituting at least 5% by weight of the pigment powder.

3. A pigment powder comprising an insoluble coloring matter substantially inseparably affixed to an insolubilized binding agent consisting substantially of a condensation product of an aminotriazine and an aldehyde, the coloring matter constituting at least 5% by weight of the pigment powder.

4. A pigment powder comprising a substantially inseparable combination of a coloring matter and an insolubilized binding agent consisting substantially of a condensation product of an aminotriazine, an aldehyde and a substance containing alcoholic hydroxy groups, the coloring matter constituting at least 5% by weight of the pigment powder.

5. A pigment powder comprising a substantially inseparable combination of a coloring matter and an insolubilized binding agent consisting substantially of a condensation product of an aminotriazine, an aldehyde and a substance selected from the group consisting of phenol, urea, thiourea and aniline, the coloring matter constituting at least 5% by weight of the pigment powder.

6. A pigment powder comprising a substantially inseparable combination of a coloring matter and an insolubilized binding agent consisting substantially of a condensation product of an aminotriazine, an aldehyde and an additional substance of basic reaction, the coloring matter constituting at least 5% by weight of the pigment powder.

7. A pigment powder comprising a substantially inseparable combination of a coloring matter and an insolubilized binding agent consisting substantially of a condensation product of an aminotriazine, an aldehyde and an additional substance of acid reaction, the coloring matter constituting at least 5% by weight of the pigment powder.

8. A pigment powder comprising a substantially inseparable combination of a coloring matter and an insolubilized binding agent consisting substantially of a condensation product of 2.4.6-triamino-1.3.5-triazine and formaldehyde, the coloring matter constituting at least 5% by weight of the pigment powder.

GUSTAV WIDMER.